P. LANTE DELLA ROVERE.
ARMORED COVER FOR THE PROTECTION OF RUBBER TIRES.
APPLICATION FILED FEB. 27, 1906.

901,300. Patented Oct. 13, 1908.

WITNESSES:
F. H. Logan
T. H. Berrigan

INVENTOR,
PIETRO LANTE DELLA ROVERE,
BY H. van Oldenneel
HIS ATTORNEY

UNITED STATES PATENT OFFICE.

PIETRO LANTE DELLA ROVERE, OF BAGNAIA, NEAR VITERBO, ITALY.

ARMORED COVER FOR THE PROTECTION OF RUBBER TIRES.

No. 901,300.            Specification of Letters Patent.            Patented Oct. 13, 1908.

Application filed February 27, 1906. Serial No. 303,320.

*To all whom it may concern:*

Be it known that I, PIETRO LANTE DELLA ROVERE, a subject of the King of Italy, residing in Bagnaia, near Viterbo, in the Province of Rome, Italy, have invented certain new and useful Improvements in Armored Covers for the Protection of Rubber Tires, of which the following is a specification.

This invention relates to an improved cover for rubber tires the object of the same being to protect the air chamber from puncturing or from being in any other way damaged by stone splinters or other sharp objects, at the same time preventing the said air chamber, or the solid rubber tire fitted with this improved cover, from being rapidly worn out.

The armored cover forming the subject of the present invention acts also as a non-skidding cover and can be readily adapted to fit tires of bicycles, automobiles and other carriages of every description, although in the following description as an example of the practical application of this invention, will be described a cover more particularly adapted for automobiles.

Figure 1:
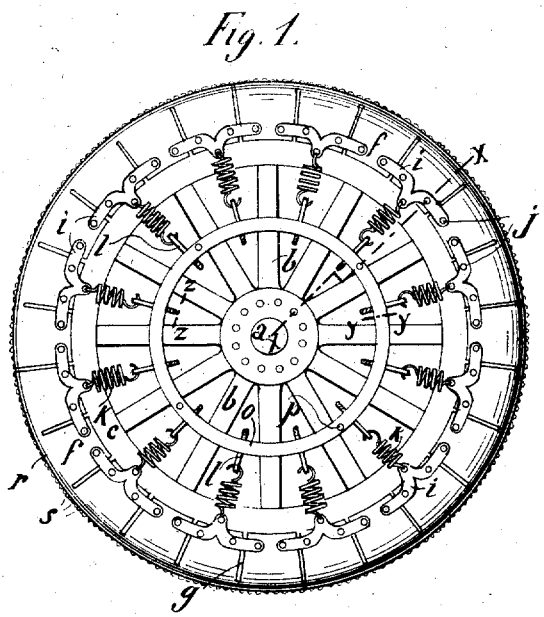
Figure 4:
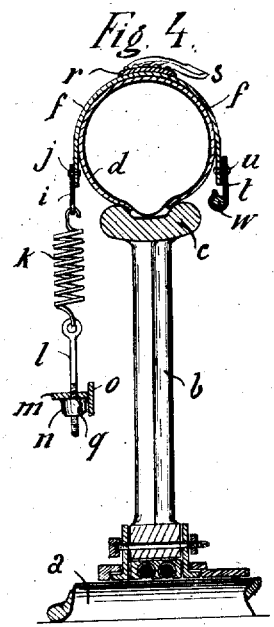
Figure 5:
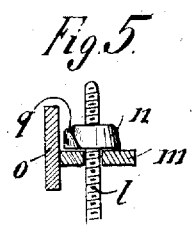
Figure 6:
Figure 2:
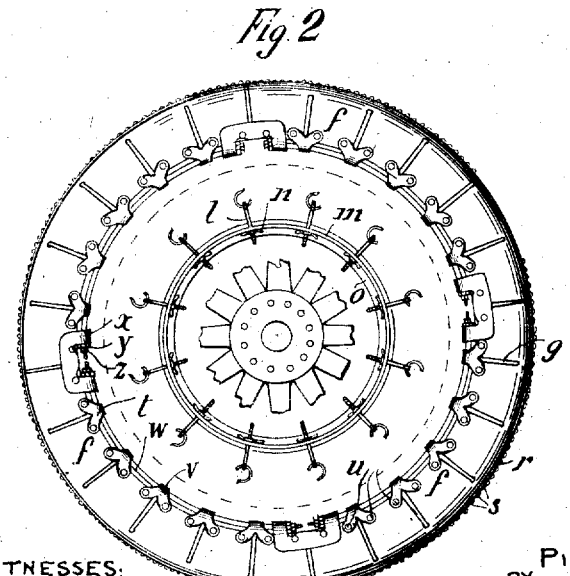
Figure 3:
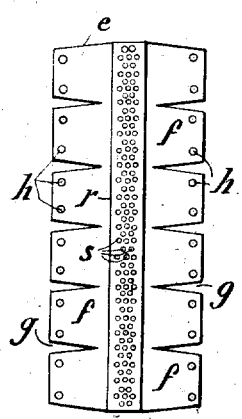

In order that the following description may more readily be understood reference shall be had to the accompanying drawings, in which Figure 1 shows a view of the external side of a wheel furnished with the armored cover according to the present invention; Fig. 2 shows a view of the inner side of the same wheel; Fig. 3 is a portion of the cover unwound; Figs. 4, 5 and 6 are, respectively, sections on lines X X, Y Y, and Z Z of Fig. 1.

On axle —a— is mounted the wheel, whose spokes —b— support the rim —c— of wood or of metal; to the rim is secured in any convenient way the tire —d—. On the same axle is also keyed the chain-wheel which receives the motion from the motor of the automobile; this chain-wheel is not shown in the drawing.

The cover consists of a certain number of elements —e— (Fig. 3); in the drawing it is supposed that four of the said elements form the entire cover. The tire elements are preferably chrome tanned calf-skin leather. Each of the said elements is formed of a convenient number of portions (in the drawing six are shown) made clearly distinct by the triangular notches —o— cut in the two edges of each element. These notches are of help in facilitating the fitting of the cover to the curved surface of the tire; but they are not indispensable, either because the puckers which might otherwise form in the edges owing to their excessive length, do not occasion any inconvenience, or because leather, is eminently adaptable to curves, and may be suitably curved in order to adjust it to the tire. As it appears from the drawing, the central part of the cover rests on the tire, while the lateral parts remain extended towards the hub of the wheel. In the edges of the cover the holes —h— are provided, two in each section of an element, and narrow strips —i— are applied against the inner contour of the cover (Fig. 1) so that each comprises a whole section on an element and a part of the lateral ones.

In the narrow strips four holes are made corresponding to those of the cover, for the purpose of fastening those parts by means of screw-bolts —j—; the number of the metallic strips is thus half that of the sections. To the said strips are fastened the spiral springs —k— carrying the threaded rods —l—; the latter are screwed in the ring —m— (Figs. 5 and 6) and are so adjusted as to render uniform the tension of the strips —i—; they are kept in position by means of winged nuts —n—. In order that these nuts may not loosen, after the tension of the spiral springs has been regulated the locking rim —o— is placed against the ring —m— and fastened thereto with screws —p—; the wings —q— of the nuts —n— on account of their length or their eccentricity to the axis of the nut, will prevent the rotation of this nut, because they will be stopped by the locking ring —o—.

Along the central longitudinal part of each element (Fig. 3) is laid a strengthening zone —r—; this zone is secured to the band by means of rivets —s— set very close together. These rivets have, towards the outside of the cover, a spherical or conical head, and serve, not only to increase the adherence of the wheel to the ground, especially on country roads, but also to diminish the contact of the zone itself with the ground and thus to protect the zone itself, and prevent its wearing out quickly. The conical form of the heads of the rivets may be of especial use for drives over ice.

Upon the inner side of the wheel the same arrangement may be adopted as has now been described for the outer. However, when the motor mechanism, in general, and, more especially, the position and the size of the chain-wheel do not admit of the application of the ring —m— with the spiral springs —k— then the adjustment of the section —f— (Fig. 2) is effected by means of the latches —t— fixed by means of screw-bolts or rivets —u— in the various holes —h— of the cover section, which are thus united at their contiguous edges. Each latch —t— carries a small tube —v— designed to receive the segments of the small circular bars —w— which extend through a convenient number of sections, preferably coinciding with the group of sections which form an element; in Fig. 3 each small bar thus comprises six sections. At the points of separation of the small bars are placed stretchers —x— which connect the contiguous elements. In order that the small bars —w— may not slide in the tubes —v— their ends are furnished with a nut —y— and a counter-nut —z—.

The strips —i— and the latches are made of aluminium in order to obtain resistances lightness and elegance; the rivets and the screw-bolts are of brass, the other metallic pieces are made of iron or of polished or nickel plated steel. Of course other metals may also be used without departing from the characteristics of the invention.

Claim.

An armored cover for the protection of rubber tires consisting of a succession of leather elements, each comprising a group of sections limited by means of V-shaped notches made in the edges thereof, and with narrow strips connecting the sections, a locking ring, screw rods adjustably connected with said ring, springs connecting said adjustable screw rods to said strips, the cover elements being protected by zones of leather furnished with rivets whose heads project radially therefrom.

Signed by me at Rome, in the Kingdom of Italy this seventh day of February 1906.

PIETRO LANTE DELLA ROVERE.

Witnesses:
　A. RAGGI,
　QUAGLIOTTI.